United States Patent
Schulte

(10) Patent No.: US 7,293,366 B2
(45) Date of Patent: Nov. 13, 2007

(54) DISTANCE MEASUREMENT DEVICE

(75) Inventor: Clemens Schulte, Stuttgart (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/568,924

(22) PCT Filed: Jul. 28, 2004

(86) PCT No.: PCT/DE2004/001696

§ 371 (c)(1),
(2), (4) Date: Feb. 21, 2006

(87) PCT Pub. No.: WO2005/038406

PCT Pub. Date: Apr. 28, 2005

(65) Prior Publication Data

US 2006/0225296 A1    Oct. 12, 2006

(30) Foreign Application Priority Data

Sep. 25, 2003   (DE) ............................... 103 44 586

(51) Int. Cl.
   *G01B 21/16*   (2006.01)
(52) U.S. Cl. .................... 33/700; 33/832; 356/3; 367/99
(58) Field of Classification Search .......... 33/284, 33/501.06, 613, 645, 700, 757, 770, 809, 33/832; 342/118; 356/3; 367/99, 118
See application file for complete search history.

(56) References Cited

U.S. PATENT DOCUMENTS

| | | | | |
|---|---|---|---|---|
| 1,338,176 A | * | 4/1920 | Finstrom | 33/809 |
| 5,287,627 A | * | 2/1994 | Rando | 33/700 |
| 6,101,734 A | * | 8/2000 | Ten Caat et al. | 33/770 |
| 6,526,673 B1 | | 3/2003 | Reed | |
| 6,928,029 B2 | * | 8/2005 | Rickman | 367/99 |
| 7,168,182 B2 | * | 1/2007 | Kilpatrick et al. | 33/770 |
| 2002/0011007 A1 | * | 1/2002 | Byrd | 33/760 |
| 2004/0060376 A1 | * | 4/2004 | Munro | 367/99 |
| 2007/0008820 A1 | * | 1/2007 | Yang | 367/99 |

FOREIGN PATENT DOCUMENTS

| | | |
|---|---|---|
| DE | 30 47 785 | 7/1982 |
| DE | 198 04 051 | 8/1999 |
| DE | 200 22 511 | 2/2002 |
| DE | 101 42 166 | 3/2003 |
| DE | 101 49 144 | 4/2003 |
| EP | 0 828 165 | 3/1998 |
| NL | 1003305 | 7/1996 |
| WO | WO98/27439 | 6/1998 |

* cited by examiner

*Primary Examiner*—G. Bradley Bennett
(74) *Attorney, Agent, or Firm*—Michael Best & Friedrich LLP

(57) ABSTRACT

The invention starts with a range finder with a measuring device and at least one measuring limit stop body (12), which can be moved out of a housing (10) and features at least one measuring limit stop (22, 24, 26, 28, 30) in a reference plane (14) for range finding between the reference plane (14) and an object that is to be measured. It is proposed that a first side (16) of the measuring limit stop body (12) form a first and a second measuring limit stop (22, 24).

22 Claims, 3 Drawing Sheets

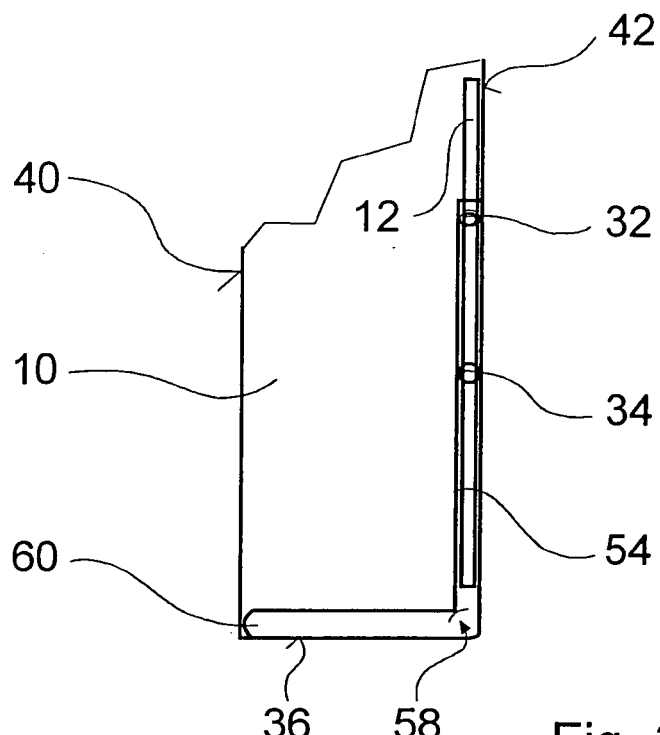 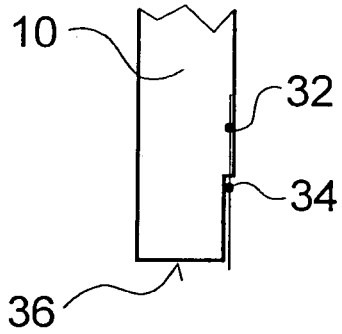
Fig. 3a Fig. 3b
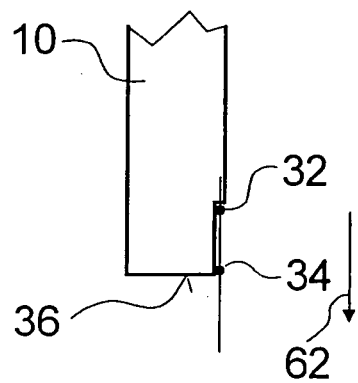 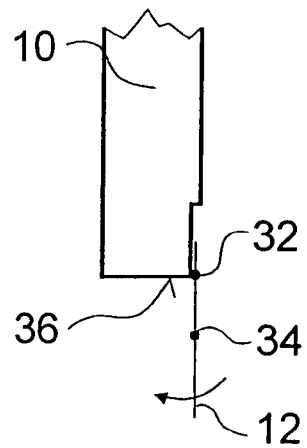
Fig. 3c Fig. 3d
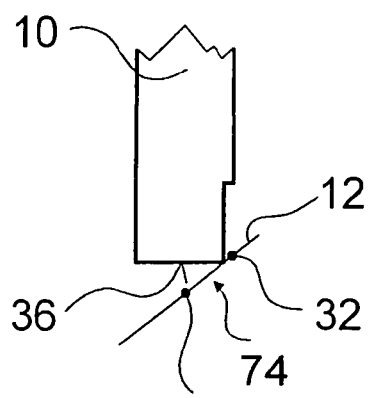 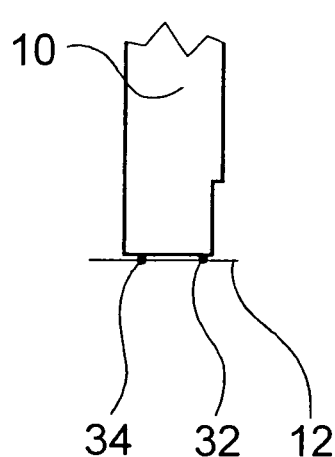
Fig. 3e Fig. 3f

DISTANCE MEASUREMENT DEVICE

BACKGROUND OF THE INVENTION

The invention starts with a range finder.

A range finder for contactless range finding, which can be performed with three range finding measuring types, is known from the Unexamined German Application DE 101 42 166A1. By applying a line-shaped first measuring limit stop to a corner line facing the to-be-measured object and by applying a flat second measuring limit stop to a surface facing the object, distances between the object and the corner line and the surface can be determined. Through a third measuring limit stop, the distance between the object and a surface facing away from the object can be determined. To apply the third measuring limit stop to the surface facing away from the object, a swivel flap is swiveled out on a swivel part, forming the second measuring limit stop, whereby in a fixed swivel position of the swivel part and the swivel flap, the third measuring limit stop points in the measuring direction and lies in the reference plane for the distance measurement in which all three measuring limit stops lie after their respective activation. Each measuring limit stop is arranged on another measuring limit stop body.

SUMMARY OF THE INVENTION

The invention starts with a range finder with a measuring device and at least one measuring limit stop body, which can be moved out of housing and features at least one measuring limit stop in a reference plane for measuring a distance between the reference plane and an object that is to be measured.

It is proposed that a first side of the measuring limit stop body form a first and a second measuring limit stop. The first side preferably occupies different positions with respect to the housing. By pulling the measuring limit stop body out of the housing of the range finder, preferably in a direction parallel to a measuring direction, a measuring reference can be switched over on the different measuring limit stops. To do this, on the one hand, an arithmetic-logic unit and/or evaluation unit are expediently provided, which, if necessary, correct a signal of the measuring device taking a defined position of the measuring limit stop body into consideration and, on the other hand, detection means to recognize a defined position of the measuring limit stop body. Sensors can be provided, which automatically detect the position and if necessary the swivel angle setting of the measuring limit stop body vis-à-vis the housing, in particular the measuring device, or this type of data can be input manually via an input device, such as a keyboard, that is allocated to the range finder. The distances of corners, grooves, edges, for example in the case of windows, and surfaces facing or facing away from the to-be-measured object can be determined with a single measuring limit stop body. Additional end pieces or adapters for different measuring tasks can be eliminated. The rear side of the device is favorably aligned parallel to the reference plane. An optical measuring device, in particular a laser measuring device, is preferred as the measuring device, in which a transmission signal is sent to the to-be-measured object and a run-time measurement is made with respect to the distance between the object and reference plane. An ultrasound or even a high-frequency measuring device can be used as an alternative.

A first side of the measuring limit stop body preferably forms the first measuring limit stop when the measuring limit stop body is located in a position retracted into the housing. However, the first side can also lie in the retracted position within a housing border without forming a measuring limit stop. The first side is preferably a narrow side of the measuring limit stop body. This is located completely in the housing, while the narrow side is aligned with a device rear side of the housing. The entire surface of the device rear side as a stable bearing surface can be applied to a side facing the object. The reference plane, which is normally aligned perpendicular to the measuring direction, coincides with the surface of the device rear side. The first side in this position preferably forms the measuring limit stop for a surface facing the object that is to be measured.

If the first side of the measuring limit stop body forms the second measuring limit stop when the measuring limit stop body is located in a position that is telescoped out of the housing, another measuring configuration can be represented with the same side of the measuring limit stop body by simply pulling out the measuring limit stop body, which side can be applied to the corners and grooves facing the object that is to be measured. Locking means can be expediently provided so that it is possible to lock the measuring limit stop body into place in the telescoped position at a defined location. The reference plane is henceforth removed from the device rear side. Measuring signals can be corrected with great precision with respect to the modified reference plane. This is preferably accomplished by means of an arithmetic-logic unit, which cooperates with the measuring device. To do this, a current position signal of the measuring limit stop body is transmitted to the arithmetic-logic unit.

A first flat side of the measuring limit stop body can form a third measuring limit stop when the measuring limit stop body is located in a position that is swung out vis-à-vis the housing. To do this, the measuring limit stop body in a telescoped state can swivel around a swivel axis, particularly around a constant swivel point, and be placed in front of the device rear side. The first flat slide can be applied to a surface facing away from the object that is to be measured. A correction with respect to the thickness of the measuring limit stop body can be correspondingly performed if the reference plane is located on the opposing flat side.

If a second flat side of the measuring limit stop body forms a fourth measuring limit stop when the measuring limit stop body is located in a position that is swung out vis-à-vis the housing, a side facing the object that is to be measured can be contacted in the same position of the measuring limit stop body. As a result, an especially large, stable supporting surface is available, whose surface is greater than the device rear side.

The second flat side forms a fifth measuring limit stop when the measuring limit stop body is located in a swiveled-out position. Then the distance of a point of a diagonal surface and the surface facing the object that is to be measured can be determined. A swivel axis is provided in a center area of the measuring limit stop body as related to its longitudinal extension in the measuring direction, which fixes a defined swivel point and also permits the opposing flat side to be applied to a diagonal surface facing away from the object that is to be measured. A measurement according to the so-called Pythagoras principle also permits an indirect determination of a distance between two points, in that a substitute measured distance is determined starting from one measuring point to each of the two points and with at least one angle of the triangle formed by the three distances being known. If a substitute segment is perpendicular to the distance sought, the Pythagorean theorem can be used to determine the distances. If the angle between the two substitute measured distances is known, this can occur by means of the known cosine law. This can be accomplished via a tripod measurement by putting the range finder on a tripod so that it can swivel around a tripod axis, or by swiveling the measuring limit stop body by a defined swivel angle. Advantageously, a distance can be determined indirectly with or without a tripod. With one or more detected swivel angles and distances, various arithmetic operations can be executed as needed in a coordinating arithmetic-logic unit. Specific angles and/or inclinations of walls, floors, ceilings, etc, distances, surfaces and/or various volumes can be determined, for example, by multiplication, subtraction, integration, and application of the cosine law. To do so, the measuring limit stop body can be swiveled around the swivel axis by various swivel angles.

If the measuring limit stop body features at least one swivel axis perpendicular to an extension direction of the measuring limit stop body for swiveling and/or locking the measuring limit stop body, the measuring limit stop body can be held in defined diagonal positions. Means to acquire and/or input the swivel angle are preferably provided. High measuring precision is rendered possible. If two swivel axes are provided, the measuring limit stop body can be telescoped out in various lengths and secured by locking means that cooperate with the swivel axis, thereby making surfaces that are difficult to access, e.g., deep grooves, reachable.

If the measuring limit stop body extends in one dimension from one side surface of the housing to another side surface, a maximum supporting surface is produced even with small range finders. This permits a compact design of small, handy range finders.

If the measuring limit stop body is embodied as a flat plate, an especially stable bearing surface is offered and can function in a retracted state as a part of the housing. The plate is preferably made of metal. However, the person skilled in the art will select another material if this appears to be meaningful.

If the measuring limit stop body defines a plane and is U-shaped when viewed perpendicular to that plane, weight can be saved and at the same time a favorable and especially space-saving arrangement of the U-shaped stop body can be achieved around the measuring device, which can also include an arithmetic-logic unit and/or evaluation unit, that is located in the inside of the range finder.

An edge-side recess is preferably provided in the range finder in the first device flat side, through which the legs of the measuring limit stop body can be released for swiveling. The U-shaped stop body can be favorably swiveled approximately around a center swivel axis. The range finder can be shorter in terms of its structural length.

If means are provided to detect a position and/or a swivel angle of the measuring limit stop body, the operation of the range finder is facilitated. As an alternative, the position and/or swivel angle can also be input manually into the range finder.

Several axes for swiveling and guides for guiding the measuring limit stop body can also be expediently provided in order to influence the movement possibilities and locking of the measuring limit stop body. Locking devices and/or guides permit the measuring limit stop body to be fixed in a defined position. As an option, a spring initial stress can provide for comfortably snapping the measuring limit stop body into the positions. The range finder in accordance with the invention can be used particularly favorably as a handheld device.

BRIEF DESCRIPTION OF THE DRAWINGS

Additional advantages are yielded from the following description of the drawing. Three exemplary embodiments of the invention are depicted in the drawings. The drawing, the description and the claims contain numerous features in combination. The person skilled in the art will also observe individual features expediently and combine them into additional, meaningful combinations.

The drawing show:

FIG. 3 A schematic side view of a preferred range finder with a measuring limit stop body with two swivel axes.

DETAILED DESCRIPTION

Figure 1A:
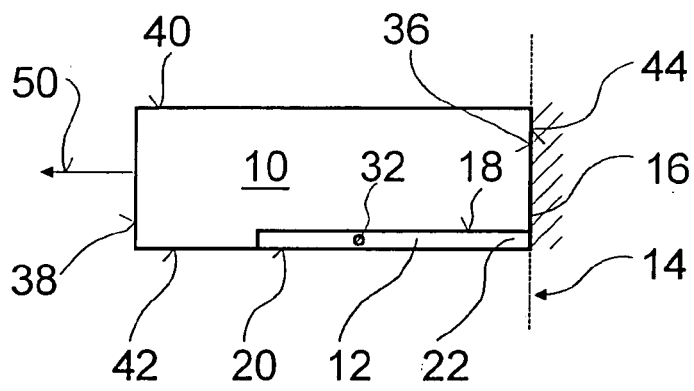
FIG. 1 A schematic side view of a preferred range finder with a first preferred measuring limit stop body, (a) in a retracted position, (b) in a telescoped position, (c) in a swiveled-out position, (d) in a swung-out position.
Figure 1B:
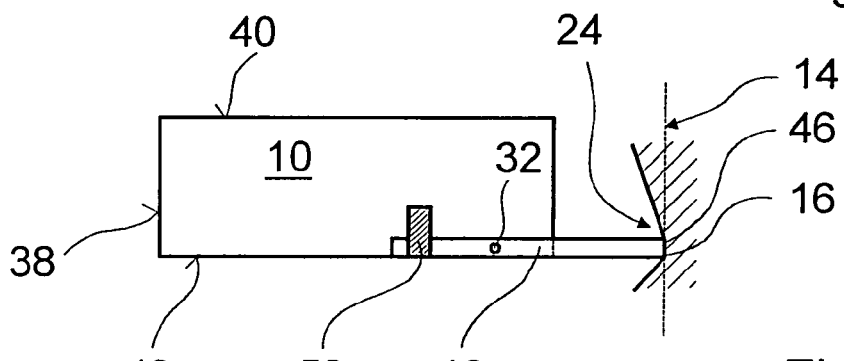

Wherever possible the same or corresponding parts with the same reference numbers are used in the figures.

A preferred range finder in FIG. 1*a-d* shows a measuring limit stop body 12 connected to a housing 10 in different, defined positions. Details of the range finder, such as a measuring device with any arithmetic-logic and/or evaluation units for evaluation and possible output of a measuring signal, are not depicted. The housing 10 features a front side 38, which is facing the object that is to be measured (not shown), and from which a transmission signal in a measuring device 50 is transmitted, as well as device rear side 36, which is facing a reference plane 14, with which the measuring limit stop body 12 is brought into contact. The device rear side 36 is expediently aligned with the reference plane 14. In addition, an upper flat side 40 and a lower flat side 42 are provided. A first flat side 18 of the measuring limit stop body 12 is facing the housing 10 on a large surface. In the lower flat side 42 of the housing 10 a second flat side 20 of the measuring limit stop body 12 forms a part of said lower flat side and is aligned therewith. However, the second flat side 20 could also be arranged at a distance to the flat side 42. The measuring limit stop body 12 in a position retracted into the housing 10 preferably forms a portion of the housing 10. A first side 16 perpendicular to the flat sides 18, 20, a narrow side of the measuring limit stop body 12, aligns with the device rear side 36 of the housing 10 (FIG. 1*a*) and as a first measuring limit stop 22 is adjacent on a large surface together with the device rear side 36 to a surface 44 facing the object that is to be measured, which coincides with a reference plane 14.

The measuring limit stop body 12 can be moved out of the housing 10 (FIG. 1*b*) and features a second measuring limit stop 24 in the reference plane 14 for range finding.

The measuring limit stop body 12 can preferably be pulled out of the device rear side 36 parallel to the measuring device 50. The first side 16 is adjacent to a corner 46 facing the object. In the telescoped position shown, locking means 52 are provided to lock the measuring limit stop body 12 into place in a defined position. The reference plane 14, is removed from the device rear side 36, preferably parallel to the device rear side 36.

Figure 1C:
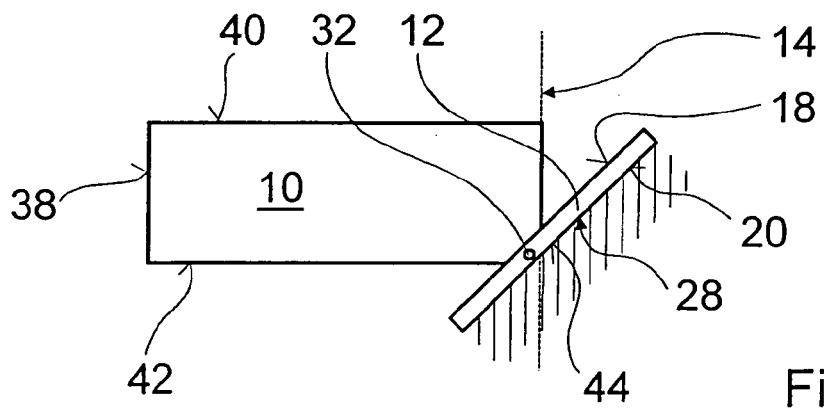
Figure 1D:
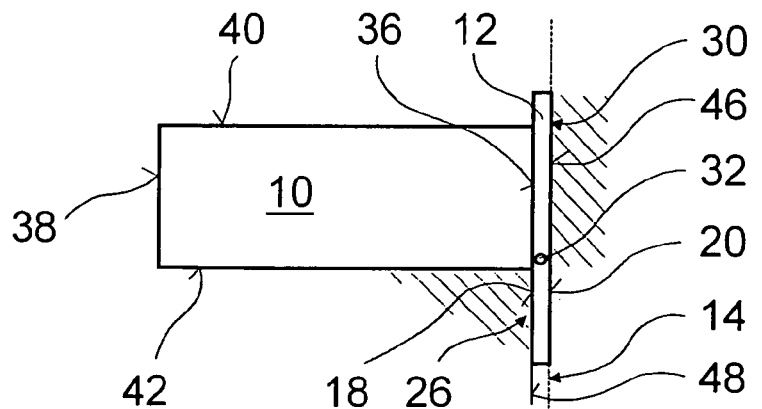

The measuring limit stop body 12 features a third measuring limit stop 26 for a surface 48 facing away from the object when the measuring limit stop body 12 is telescoped so far out of the housing 10 that it can be swiveled around a swivel axis 32 by 90° and placed in front of the device rear side 36 (FIG. 1*d*). The measuring limit stop body 12 is longer than the housing 10 is high so that a portion of the measuring limit stop body 12 projects on both sides. The first flat side 18 of the measuring limit stop body 12 can therefore be applied to a surface 48 facing away from the object to be measured. The reference plane 14 coincides with the second flat side 20, and a measuring signal can be corrected by a thickness of the measuring limit stop body 12. In addition to a software-related correction, a mechanical correction would also be conceivable. In the same way, the second flat side 20 can be put adjacent to a surface 44 facing the object.

In FIG. 1*c* the second flat side 20 forms a fifth measuring limit stop 30, whereby the measuring limit stop body 12 projects from the device rear side 36 in a swiveled-out position at a swivel angle between 0° and 90°, whereby the measuring limit stop body 12 is swiveled around the swivel axis 32 and adjacent to a diagonal surface 44. The reference plane 14 coincides with the device rear side 36. The measuring limit stop body 12 is embodied favorably as a flat plate, which is preferably as wide as the lower flat side 42. The plate can be guided through guide grooves (not shown) in the range finder, preferably those in which the swivel axis 32 that is fixed to the first flat side 18 are guided. Sensors (not shown) are preferably provided, which detect the set swivel angle and transmit to an arithmetic-logic unit (not shown). Alternatively, in the case of a known swivel angle, the corresponding value can be input via keyboard.

Figure 2A:
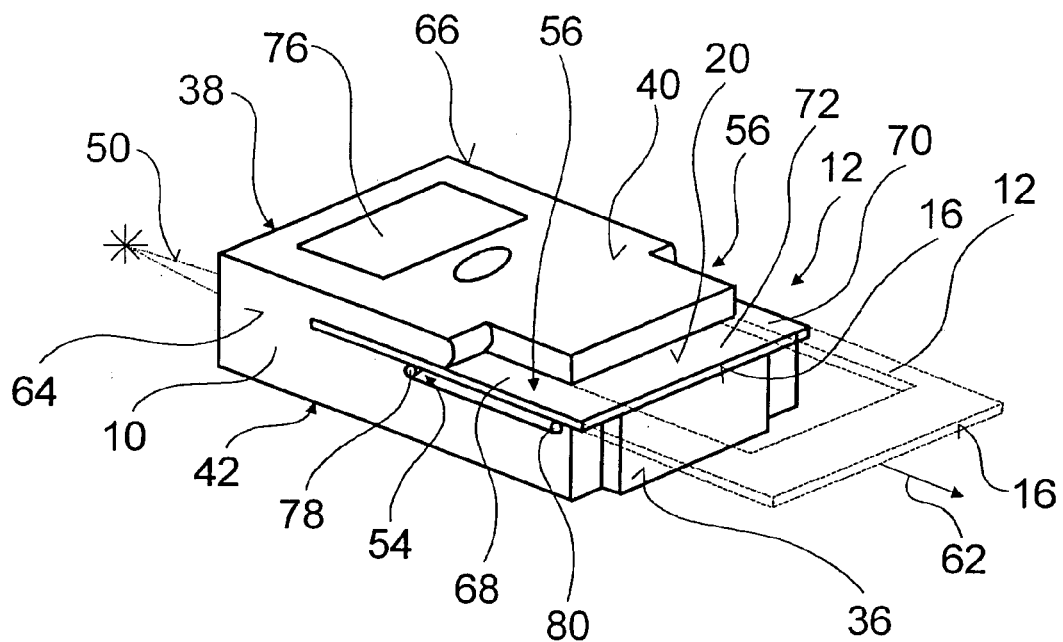
FIG. 2 An oblique top view of a preferred range finder with a second preferred measuring limit stop body in U-shaped form, (a) in the retracted position and telescoped position (dashed line), (b) the U-shaped measuring limit stop body in detail, (c) the measuring limit stop body in the swung-out position.
Figure 2B:
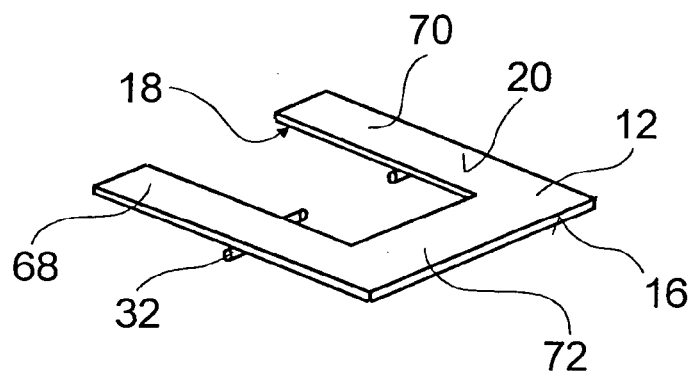
Figure 2C:
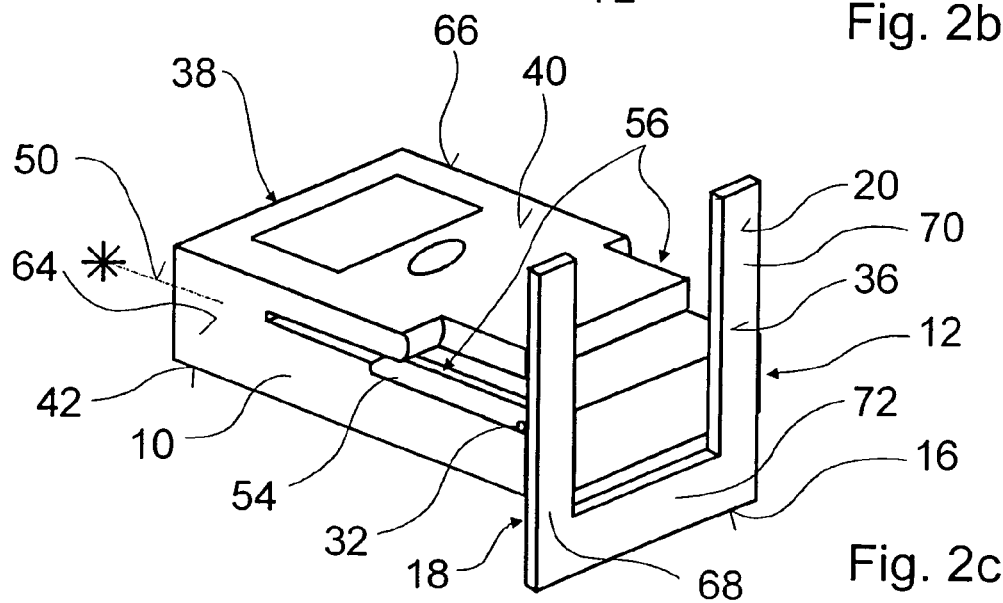

FIG. 2 *a-c* shows a preferred embodiment of the measuring limit stop body 12, which is embodied as a flat U-shaped member with two legs 68, 70 and a cross strut 72 connecting these legs, whereby the cross strut 72 is arranged on the device rear side 36 and in a retracted position the legs 68, 70 point towards the object that is to be measured. The U-shaped stop body can be pulled out of the device rear side 36 in an extension direction 62. The measuring limit stop body 12 is arranged approximately in the center between the device flat sides 40, 42. A guide groove 54 is provided as a guide. The guide groove 54 features a rear limit stop 78 and a front limit stop 80 for the preferably welded-on swivel axis 32, on which the measuring limit stop body 12 impacts with the swivel axis 32 in the retracted or telescoped position. Display and input units 76 (not shown in greater detail) can be provided on the first device flat side 40. A deep, edge-side recess 56 is provided in the housing 10 in the upper device flat side 40 through which the legs 68, 70 of the measuring limit stop body 12 can be released for swiveling around the swivel axis 32, if the measuring limit stop body is located in the telescoped position. The cross strut 72 occupies the entire width of the housing 10, in that the measuring limit stop body 12 extends in one dimension from one side surface 64 of the range finder 12 to another side surface 66. The device rear side 36 preferably has lateral recesses on the narrow sides so that the measuring limit stop body 12 fits around the device rear side 36 with the legs 68, 70 and the cross strut 72. The device rear side 36 together with the U-shaped stop body can form the supporting surface.

The flat sides 18, 20 and the first side 16 can be brought into contact with corresponding surfaces and structures, as described in FIG. 1. A Pythagorean measurement can be performed in the measuring limit stop body's 12 telescoped position. Alternatively, the measuring limit stop body 12 can be inserted into a device flat side 40, 42 similar to in FIG. 1.

FIG. 3*a-f* shows a variation in which the measuring limit stop body 12 features two parallel swivel axes 32, 34 at a distance from one another perpendicular to the extension direction 62 of the measuring limit stop body 12 for swiveling and/or locking the measuring limit stop body 12. Locking means 58, 60 can be provided on the device side on the device rear side 36, and these locking means cooperate with the swivel axes 32, 34 of the measuring limit stop body 12 in such a way that they lock into place with these in the swung-out state (FIG. 3*f*) and are fixed on the device rear side 36. FIGS. 3*a* and 3*b* show the measuring limit stop body 12 in a retracted position. In FIG. 3*c* the measuring limit stop body 12 is, telescoped up to the front swivel axis 34 in the extension direction 62 and in FIG. 3*d* telescoped up to the rear swivel axis 32. In this position the measuring limit stop body 12 is still prevented from swiveling, and namely because it is still partially projecting into the housing 10 and prevented by it from swiveling. In this position the measuring limit stop body 12 can be swiveled in front of the device rear side 36 of the housing 10 in such a way that both swivel axes 32, 34 can be held with both locking means 58, 60 (FIG. 3*f*). The measuring limit stop body 12 can be swiveled in both positions around the respective swivel axis 32, 34, for instance for Pythagorean measurements or to detect angles. FIG. 3*e* shows a position of the measuring limit stop body 12, in which this is swiveled around the front swivel axis 34 by an angle in order to make contact with a diagonal surface 74. In this case as well, automatic or manual means can be provided to detect the position and/or the swivel angle of the measuring limit stop body 12.

The invention claimed is:

1. Range finder comprising a housing, a measuring device and at least one measuring limit stop body (12), wherein the at least one measuring limit stop body and the measuring device comprise separate structures associated with different sides of the housing (10) and wherein the at least one measuring limit stop body can be moved out of a housing (10) and features at least one measuring limit stop (22, 24, 26, 28, 30) in a reference plane (14), wherein a transmission signal is sent from the measuring device to an object for range finding between the reference plane (14) and the object, characterized in that, a first side (16) of the measuring limit stop body (12) forms a first and a second measuring limit stop (22, 24).

2. Range finder according to claim 1, characterized in that, the first side (16) of the measuring limit stop body (12) forms the first measuring limit stop (22) when the measuring limit stop body (12) is located in a position retracted into the housing (10).

3. Range finder according to claim 1, characterized in that, the first side (16) of the measuring limit stop body (12) forms the second measuring limit stop (24) when the measuring limit stop body (12) is located in a position that is telescoped out of the housing (10).

4. Range finder according to claim 1, characterized in that, a first flat side (18) of the measuring limit stop body (12) forms a third measuring limit stop (26) when the measuring limit stop body (12) is located in a position that is swung out vis-à-vis the housing (10).

5. Range finder according to claim 1, characterized in that, a second flat side (20) of the measuring limit stop body (12) forms a fourth measuring limit stop (28) when the measuring limit stop body (12) is located in a position that is swung out vis-à-vis the housing (10).

6. Range finder according to claim 5, characterized in that, the second flat side (20) forms a fifth measuring limit stop (30) when the measuring limit stop body (12) is located in a swiveled-out position.

7. Range finder according to claim 1, characterized in that, the measuring limit stop body (12) features at least one swivel axis (32, 24) perpendicular to an extension direction (62) of the measuring limit stop body (12) for swiveling and/or locking the measuring limit stop body (12).

8. Range finder according to claim 1, characterized in that, the measuring limit stop body (12) extends in one dimension from one side surface (64) of the housing (10) to another side surface (66).

9. Range finder according to claim 1, characterized in that, the measuring limit stop body (12) is embodied as a flat plate.

10. Range finder according to claim 9, characterized in that, the measuring limit stop body (12) defines a plane and is U-shaped when viewed perpendicular to said plane.

11. Range finder according to claim 10, characterized in that, the measuring limit stop body (12) has two legs (68,70) and a cross strut (72) connecting the legs, and an edge-side recess (56) is provided in a first device flat side (40) of the housing (10) through which the legs (68, 70) of the measuring limit stop body (12) can be released for swiveling of the stop body.

12. Range finder according to claim 1, characterized in that, means are provided to detect a position and/or a swivel angle of the measuring limit stop body (12).

13. Range finder according to claim 2, characterized in that, the first side (16) of the measuring limit stop body (12) forms the second measuring limit stop (24) when the measuring limit stop body (12) is located in a position that is telescoped out of the housing (10).

14. Range finder according to claim 13, characterized in that, a first flat side (18) of the measuring limit stop body (12) forms a third measuring limit stop (26) when the measuring limit stop body (12) is located in a position that is swung out vis-à-vis the housing (10).

15. Range finder according to claim 14, characterized in that, a second flat side (20) of the measuring limit stop body (12) forms a fourth measuring limit stop (28) when the measuring limit stop body (12) is located in a position that is swung out vis-à-vis the housing (10).

16. Range finder according to claim 15, characterized in that, the second flat side (20) forms a fifth measuring limit stop (30) when the measuring limit stop body (12) is located in a swiveled-out position.

17. Range finder according to claim 16, characterized in that, the measuring limit stop body (12) features at least one swivel axis (32, 24) perpendicular to an extension direction (62) of the measuring limit stop body (12) for swiveling and/or locking the measuring limit stop body (12).

18. Range finder according to claim 17, characterized in that, the measuring limit stop body (12) extends in one dimension from one side surface (64) of the housing (10) to another side surface (66).

19. Range finder according to claim 18, characterized in that, the measuring limit stop body (12) is embodied as a flat plate.

20. Range finder according to claim 19, characterized in that, the measuring limit stop body (12) defines a plane and is U-shaped when viewed perpendicular to said plane.

21. Range finder according to claim 20, characterized in that, the measuring limit stop body (12) has two lees (68, 70) and a cross strut (72) connecting the legs, and an edge-side recess (56) is provided in a first device flat side (40) of the housing (10) through which the legs (68, 70) of the measuring limit stop body (12) can be released for swiveling of the stop body.

22. Range finder according to claim 21, characterized in that, means are provided to detect a position and/or a swivel angle of the measuring limit stop body (12).

* * * * *